June 4, 1968     L. NITZKI ET AL     3,386,516
METHOD FOR INCREASING THE PROPULSION EFFICIENCY OF A PROPELLER
Filed Dec. 7, 1966     2 Sheets-Sheet 1

INVENTORS
Leopold Nitzki
Volker Nitzki
BY
Michael S. Striker
ATTORNEY $$S = \int \rho \, dQ \, \Delta W$$

$$S + \delta S = \int \rho \, dQ \, \Delta W + \int \rho \, dq \, \delta W$$

3,386,516
METHOD FOR INCREASING THE PROPULSION EFFICIENCY OF A PROPELLER
Leopold Nitzki and Volker Nitzki, Bremen, Germany, assignors to Aktien-Gesellschaft "Weser," Bremen, Germany
Filed Dec. 7, 1966, Ser. No. 600,697
Claims priority, application Germany, Dec. 7, 1965, A 50,999
7 Claims. (Cl. 170—135)

ABSTRACT OF THE DISCLOSURE

Axial control oscillations are produced in the propeller of a ship, and regulated and adjusted to compensate normally occurring thrust fluctuations of the propeller so that the axial propeller thrust is increased.

Background of the invention

The present invention relates to ship's propellers, and more particularly to an improvement by which the efficiency of the propeller is improved.

It is known that the "Quasi Propulsive Efficiency or Coeffic." (QPC) of a ship has three components. The first is the propeller efficiency $\eta_p$ determined by the open water test, the second is the hull efficiency $\xi_s$ of the ship which includes the thrust deduction fraction and the wake fraction, and the third is efficiency factor $\xi_a$ named "Relative Rotative Efficiency." Consequently, the QPC $\xi_0$ can be expressed as follows:

$$\xi = \eta_p \cdot \xi_a \cdot s$$

The group of factors $\eta_p \cdot \xi_a$ represents the efficiency of the propeller working in the region in which the velocity of the flow is disturbed by the ship, in other words, the efficiency of the propeller when arranged behind the ship (in behind conditions). For single screw ships, the efficiency factor $\xi_a$ has values greater than 1, and for two screw ships, the efficiency factor has values below 1, which means that as far as single screw ships are concerned, the characteristic wake irregularities improve the efficiency of the propeller located behind a ship as compared with the efficiency of the propeller not located behind the ship, whereas the wake irregularities detrimentally affect the propeller efficiency of two screw ships. On the other hand, the wake irregularities although improving the efficiency of the propeller in single screw ships, cause disturbances, such as vibrations and cavitation, which is also the case for multiple screw ships.

The improvement or deterioration of the propeller efficiency is caused by a certain wing stroke effect of the propeller blade, which may have favorable or unfavorable results.

In order to prevent disturbances, the designer in the ship building art attempts to make the wake field as uniform as possible in order to prevent vibrations and damage to the propeller. On the other hand, such measures have the result that the relative rotative efficiency is reduced to a value of about 1.0 due to the fact that the stream flowing toward the propeller is not substantially different from the homogeneous flow to the propeller during the operation of the propeller while not arranged behind a ship.

The thus occurring loss on QPC, is more than compensated by the hull efficiency $$\xi_s = \frac{1-D}{1-\psi}$$

of the ship since the thrust deduction factor is sharply decreased, and the wake fraction substantially increased by the flow to the propeller being symmetrical to the rotation center of the latter one. However, it is desirable to increase the relative rotative efficiency even in this case without producing uncontrollable operational conditions which would cause the disturbances prevented by the axially symmetrical stream to again occur.

There are publications to the effect that there exist in addition to the damaging "real" thrust fluctuations, which are caused by flow conditions and are consequently uncontrollable, other thrust fluctuations, which do not cause any disturbances of the operation as explained above.

Summary of the invention

The present invention is based on the discovery that the thrust fluctuations which are not caused by flow conditions, are due to axial movements of the propeller shaft produced by reciprocating piston combustion engines driving the propeller shaft, and that such movements affect the propeller. It has also been found that thrust oscillations of this type are also produced by turbine propulsion plants due to the coincidence of the bending self-frequency of the propeller blades with higher harmonic oscillations of the "real" thrust oscillations. It has further been found that the detrimental effects of such thrust fluctuations caused by outside sources, are to be expected only within comparatively small ranges of amplitudes, phase position, frequency and wave shape of the oscillations, and at certain ratios of these determinative factors.

Based on the unexpected recognition of these facts, it is an object of the invention to produce and use thrust fluctuations for increasing the efficiency of the propeller arrangement, and thereby to obtain an improvement of the quasi propulsive coefficient.

In accordance with the invention, thrust fluctuations are purposely produced within controllable ranges and at desired strength to increase the thrust when "real" thrust fluctuations reduce the thrust so that a substantially continuous high thrust is produced.

With these objects in view, the present invention relates to a method for increasing the QPC of a ship, and comprises the steps of producing control oscillations of the propeller in axial direction for causing thrust fluctuation which are independent of the flow to the propeller, and regulating and adjusting the control oscillations so that the same counteract and compensate normally occurring thrust fluctuations of the propeller caused by flow conditions, and in such a manner that the mean propeller thrust is increased.

In accordance with the invention, the control oscillations are produced in axial direction on the propeller shaft and transmitted to the propeller and the phase position, amplitude, frequency and wave form of the control oscillation are regulated and adjusted so that the mean axial propeller thrust is increased, preferably by fully compensating the normally occuring thrust oscillations which are caused by flow conditions.

In other words, the phase position, amplitude, frequency, and wave form of the axial control oscillations are adjusted in accordance with corresponding factors of a "real" thrust fluctuation caused by flow conditions, and in such a manner that the control oscillations counteract the thrust fluctuations and increase the axial propeller thrust. In this manner, it is prevented that the absolute value of the "real" thrust fluctuations is increased.

The improvement of the propulsion efficiency obtained by the method of the invention is due to the fact that the rotating and axially oscillating propeller has flow conditions which do not correspond to the flow conditions prevailing when the propeller is tested in open water test and not located behind the ship. A displacement of the graph representing the propulsion efficiency takes place which may be mathematically represented as follows:

$$\eta_{p\ ship} = \eta_p \cdot \xi_a$$

wherein $\xi_a > 1$. The effect of the purposely produced axial control oscillations on the thrust of the propeller can be controlled at any time by means of known thrust measuring apparatus, for example according to the German Patent No. 1,006,626. A distinction must be made between axial oscillations which, concerning the bending self-frequency oscillation of the propeller blades, are subcritical, critical, or overcritical.

As regards the limit of the bending strength of the propeller blades, subcritical and overcritical control oscillations can be maintained within safe ranges. In accordance with the invention, the control oscillations, which produce the compensating thrust fluctuations, are produced within a non-resonant frequency and amplitude range and cannot cause any damage to ship or propeller. The control oscillation causes a variation of the respective thrust and torque characteristic of the open water test diagram of the propeller. In the event that the control oscillations are within the critical range, the root cross-sections of the propeller blades must be protected against breaking in the resonance range which means that the safety factor must be at least 2.

This can be taken into consideration in accordance with another feature of the invention according to which the exciting frequency of the control oscillations is adjustable to the self-frequency of the individual propeller blades, and the excitation oscillation amplitude of the control oscillations is adjustable up to the limit of safety for the permanent bending strength of the propeller blades. Since the respective amplitudes and forces are dependent on the excitation also in the resonance range, the possibility of measuring the thrust without the influence of inertia is given. This is also the case for subcritical and overcritical control oscillations. The output values of a thrust measuring device may be used as input values for the control of the excitation amplitude and frequency and phase position of the control oscillations by means of electronic devices. By using known components for measuring an excitation, the method of this invention can be applied in such a manner that the control oscillations are fully adjusted regarding phase position, amplitude, frequency, and wave shape to the corresponding factors of the thrust fluctuations caused by flow conditions so that the control oscillations completely compensate and eliminate the unavoidable "real" thrust fluctuations.

There are several possibilities for producing control oscillations as desired. In one method of the invention, the control oscillations are produced by periodically, momentarily adjusting the blade position of an adjustable propeller whereby a thrust jolt is produced. Frequently it is advantageous that the propeller blades cross sections are passed by flow in the free stream "0" flow direction, while the propulsion efficiency factor assumes values greater than 0, due to the periodical artificially produced axial oscillations.

A particularly advantageous excitation of the axial control oscillations can be produced by connecting the propeller shaft with an oscillator producing axial oscillation in the same, and with a measuring device for measuring axial oscillations. The values measured by the measuring device are the bases for regulating impulses by which the phase position, amplitude, frequency and wave form of the control oscillations produced by the oscillator are determined.

For controlling the oscillator producing the control oscillations, known electronic apparatus is suitable which, as is known to those skilled in the art, permits any desired regulation and adjustment of an oscillation so that it is possible to transform the values measured by an axial thrust measuring apparatus by means of such electronic devices, into direct control impulses regulating and adjusting the oscillator which produces the axial control oscillations.

The use of purposely produced axial control oscillations for producing compensating thrust fluctuations having controlled ranges of amplitude, phase position, frequency and wave form, presupposes that axial oscillations of the propeller shaft are not transmitted to the drive and propulsion plant. Therefore, in accordance with the invention, an elastic element is provided between the thrust bearing of the shaft, and the engine. The elastic element is constructed to be rigid in circumferential direction for transmitting a torque, while being yielding in axial direction to prevent the transmission of axial oscillations.

The arrangement of the invention permits it to obtain substantial increase of the propulsion efficiency, by a relative rotative efficiency which is greater than 1, while other advantages of the axially symmetrical flow, for example a high hull efficiency are retained.

Even in the event that the flow toward the propeller is not exactly and completely axially symmetrical, control oscillations having a suitably selected frequency, amplitude, and phase position, can be superimposed on the thrust fluctuations caused by the flow conditions, that the same are reduced to a minimum. For example, for closed propeller apertures, it is known that the thrust maximum is obtained by a propeller having four blades, when two blades are vertical and two blades are horizontal. Since the effect of a small axial movement of the propeller and of the entire shaft toward the rear is practically free of inertia and momentarily produces a forwardly directed thrust jolt, it is possible to produce an axial movement in a 45° phase position in relation to the axial thrust jolt of the "real" thrust fluctuations so that the occurring drop of the thrust is compensated, whereas due to the return of the oscillating system to the initial position, the peak of the thrust of the "real" thrust fluctuation is correspondingly reduced. In this manner, an optimal thrust, free of fluctuations, is produced when the control oscillations are properly adjusted and regulated. In the event that the thrust is uniform, the total thrust, which is correlated with the speed at which the ship moves, can be increased by selecting a suitable wave form of the oscillation, for example, rearwardly steep and forwardly gradually dropping, without energy consumption due to the slowed down forward movement of the propeller shaft system. This may be accomplished by dampening the forces causing the return.

The advantageous result of the method of the present invention can be explained by the following theory which also defines the efficiency factor $\xi_a$ in a theoretically unobjectionable manner. At the present time there is no theory explaining the physical effect of this factor, which is generally explained by unsteady flow conditions in the region of the propeller blades, while the latter is assumed to be a rigid body. As can be shown by measuring and calculations, the assumption that the propeller blade is rigid is erroneous, and does not agree with the basis of the propeller theory, namely the impulse equation.

The solution of the invention which also permits an explanation of the efficiency factor $\xi_a$ is based on recent measurements. This will be best understood from the following description of the diagrams illustrated in the accompanying drawings.

*Description of the conditions illustrated by the diagrams*

Referring first to FIGS. 1 to 4, which schematically illustrate the principle on the basis of which the efficiency factor $\xi_a$ can be explained, it is immaterial whether the elastic deformation of the propeller blades is caused by a rearwardly directed movement of the shaft, or by a thrust jolt at the propeller blade due to wake concentration in the respective position of the propeller blade. The blade is deformed between position $\alpha$ and the position $\beta$ and then recoils from the position $\beta$ to the position $\gamma$, and during the ealstic recoil movement, an additional certain amount of water $d_q$ is pushed at an accelerated speed $\delta w$ in rearward direction and superimposed on the hydrofoil effect of the blade. For a rigid propeller producing a constant thrust, corresponding values will be referred hereinafter as $dQ$, and $\Delta w$, respectively.

Figure 1:
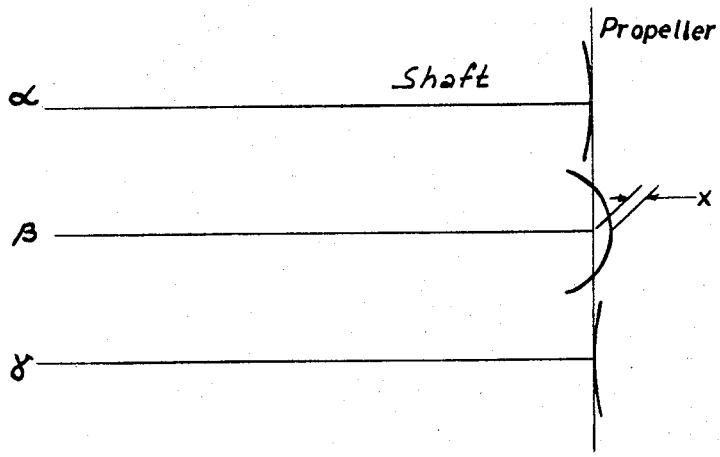
FIG. 1 is a diagram illustrating different conditions of the propeller blade.
Figure 2:
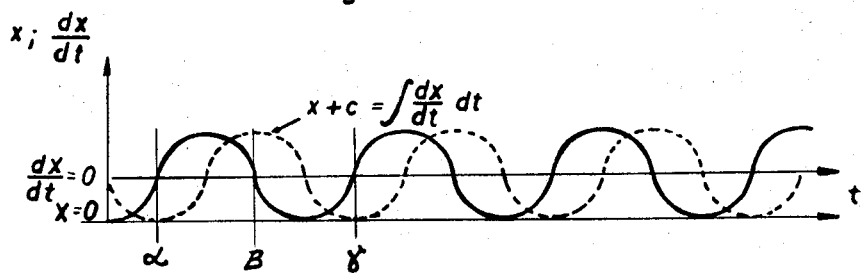
FIG. 2 is a diagram illustrating the axial speed of the oscillations.
Figure 3:
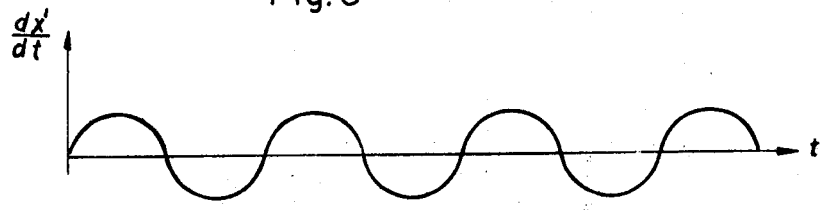
FIG. 3 is a diagram illustrating the acceleration of the oscillations.
Figure 4:
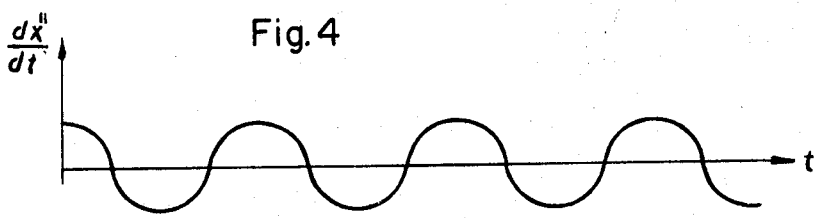
FIG. 4 is a diagram illustrating the time differential of the oscillations.

During a test drive, the axial speeds of the shaft means were measured and schematically represented in FIG. 2. Assuming that X is the displacement distance and substantially smaller than 1 mm., the first measured differential of the distance over the time is $dx/dt$. The acceleration of the shaft movement $dx'/dt$ has not a constant value as shown in FIG. 3. Thus, a further differential over the time is possible which means $dx''/dt$, as illustrated in FIG. 4.

The second differential of speed over time is indicated as a "jolt" and means that, if $$\frac{dx''}{dt} \neq 0$$

that a variation of the acceleration takes place with time. Analogous to the assumption that the propeller is an elastic resilient body with damping influences, problems of resiliency affeced by damping are also calculated with the "jolt."

The use of this concept in the propulsion theory is basically new. It is also new to explain the propulsion efficiency factor $\xi_a$ by this physical value, but this explanation is not in contrast with the impulse equation, whereas all prior explanations of this phenomenon were imcompatible with this fundamental theorem. Although the propeller in the test is assumed to be rigid, a substantial $\xi_a$ has been meaured. This however, is not contradictory, since the thrust bearing used in the test has a prestressed axially acting spring which oscillates upon the occurrence of alternating axial forces produced by the flow, and permits displacements "x."

Figure 5:
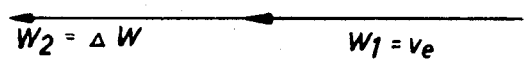
FIG. 5 is a diagram illustrating the impulse equation in relation to speed changes.
Figure 6:
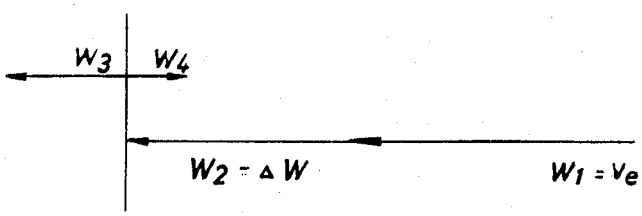
FIG. 6 is a diagram illustrating the impulse equation in relation to speed changes.
Figure 6:

The impulse equation in its original form for a rigid propeller is $$S = \int \rho \cdot dQ \cdot \Delta W$$

as indicated in FIG. 5. In this equation, S is the thrust force, $\rho$ is the density of the flowing medium, $dQ$ is an element of the amount of liquid on which the propeller acts, and $\Delta w$ is the complete velocity increase of $dQ$ during the passage through the propeller, and a value behind propeller $.dq$ is a function of the jolt frequency, including phase position, wave form and amplitude, and can be related by multiple integration to the regulable axial oscillation of the shaft means and to the elastic resilient deformation of the propeller blades caused thereby from which a component of the total propulsion, namely the resistance propeller effect is derived and substituted for $\xi_a$ with reference to a free motion diagram. Referring now to FIG. 6, and assuming $$\int \rho \cdot dq \cdot \delta w \triangleq \rho \cdot \int \mu \cdot \cos(\omega t + \phi) \cdot dt$$

it follows $$\int \rho \cdot dq \cdot \delta w = \rho \cdot \mu \cdot 1/\omega \cdot \sin(\omega t + \phi) + c$$

which represents an increase of the thrust force S of the rigid propeller by $\delta S$ from which follows $\xi_a > 1$ depending on C, for example for a single screw ship.

Assuming $$\int \rho \cdot dq \cdot \delta w \triangleq \rho \cdot \int \mu \cdot \sin(\omega t + \phi) dt$$

it follows that $$\int \rho \cdot dq \cdot \delta w = -\rho \cdot \mu \cdot 1/\omega \cdot \cos(\omega t + \phi) + c$$

Depending on C, a decrease of the thrust S of the rigid propeller may take place under this assumption and also in the first case, since cos and sin are functions related to a circle. Thus, $\xi_a < 1$, for example for a two screw ship. Only the assumption of the production of periodically alternating values of $\Delta w$, $$\Delta w = \Delta w + \delta w$$

wherein $\Delta w$ is constant, and $\delta w$ is not constant, so that $$\frac{d(\Delta w')}{dt} > 0$$

the effect of the "jolt" which continuously initiates the elastic resilient deformation of the propeller blades, and thereby varies the absorption capacity and output of the propeller as compared with a propeller in open water test and permits an efficiency factor $\xi_a$ and at the same time provides a theoretically unobjectionable explanation of the same.

It will be understood that each of the elements described above, or two or more together, may also find a useful application in other types of methods of increasing the efficiency of a propeller, differing from the types described above.

While the invention has been illustrated and described as embodied in a method of producing controlled axial oscillations of a propeller for compensating thrust fluctuation caused by the flow of water, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the specific or generic aspects of this invention and, therefore such adaptations should and are intended to be comprehended within the meaning and range of equivalence of the following claims.

What is claimed as new and desired to be protected by Letters Patent is set forth in the appended claims.

We claim:

1. A method for increasing the propulsion efficiency of the propeller for a ship; comprising the steps of producing control oscillations of the propeller in axial direction of the same for causing thrust fluctuations which are independent of the flow to the propeller; and regulating and adjusting said control oscillations so that the same counteract and compensate normally occurring thrust fluctuations of said propeller whereby the mean propeller thrust, and the efficiency of the propeller are increased.

2. The method as defined in claim 1 wherein said oscillations are produced in axial direction of the propeller in such a phase position that the axial thrust of the propeller is increased when normally occurring oscillations causing said thrust fluctuations reduce the propeller thrust whereby a continuous high thrust is maintained.

3. The method defined in claim 1 wherein said regulating includes adjusting phase position, amplitude, frequency and wave form of said control oscillation so that the axial thrust of the propeller is increased when said normally occurring thrust fluctuations reduced the propeller thrust whereby a continuous high thrust is maintained.

4. The method defined in claim 3 wherein said control oscillations are produced at a frequency and amplitude outside of the resonance frequency range of the propeller, and within a range influencing the thrust and torque characteristics of the propeller during movement of the ship.

5. The method defined in claim 3 wherein said control oscillations are regulated and adjusted to fully compensate normally occurring axial oscillations causing said normally occurring thrust fluctuation.

6. The method defined in claim 1 wherein said control oscillations are produced by an oscillator; and comprising measuring the axial oscillations; and controlling said oscillator in accordance with the measured values.

7. The method defined in claim 6 and including resiliently mounting said propeller for axial oscillations.

References Cited

UNITED STATES PATENTS

| | | | |
|---|---|---|---|
| 2,143,024 | 1/1939 | Nemeth | 170—160.25 |
| 3,228,477 | 1/1966 | Breslin | 170—160.25 |
| 3,323,598 | 6/1967 | Lindahl | 170—160.25 |

FOREIGN PATENTS

| | | |
|---|---|---|
| 882,044 | 7/1953 | Germany. |
| 325,538 | 2/1930 | Great Britain. |
| 372,266 | 1932 | Great Britain. |
| 126,385 | 6/1959 | Russia. |

EVERETTE A. POWELL, JR., *Primary Examiner.*